US012732693B2

(12) United States Patent
Kurisu

(10) Patent No.: US 12,732,693 B2
(45) Date of Patent: Sep. 8, 2026

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Hiroaki Kurisu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 18/820,427

(22) Filed: Aug. 30, 2024

(65) Prior Publication Data

US 2025/0088737 A1 Mar. 13, 2025

(30) Foreign Application Priority Data

Sep. 7, 2023 (JP) ................................ 2023-145571

(51) Int. Cl.

*H04N 23/60* (2023.01)
*G06V 10/774* (2022.01)
*H04N 23/611* (2023.01)
*H04N 23/63* (2023.01)

(52) U.S. Cl.

CPC .......... *H04N 23/64* (2023.01); *G06V 10/774* (2022.01); *H04N 23/611* (2023.01); *H04N 23/632* (2023.01)

(58) Field of Classification Search

CPC .... H04N 23/64; H04N 23/611; H04N 23/632; G06V 10/774; G06V 10/772; G06F 18/28

See application file for complete search history.

(56) References Cited

U.S. PATENT DOCUMENTS 8,311,271 B2 * 11/2012 Sakamoto ............ G06V 10/443 348/169
8,509,524 B2 * 8/2013 Yu ........................ G06V 10/255 382/159
11,144,797 B2 * 10/2021 Tsuji ......................... G06T 7/11

FOREIGN PATENT DOCUMENTS

JP 2021022081 A 2/2021

* cited by examiner

*Primary Examiner* — Ahmed A Berhan
(74) *Attorney, Agent, or Firm* — Venable LLP

(57) ABSTRACT

An information processing apparatus obtains an image for training and a piece of image capturing information which relates to capturing that image and generates a piece of dictionary data which identifies an operation of a trained machine learning model by training a machine learning model using obtained images. The apparatus manages, for each generated piece of dictionary data, pieces of image capturing information of images used for training a machine learning model pertaining to that piece of dictionary data and selects, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

15 Claims, 12 Drawing Sheets

FIG. 1

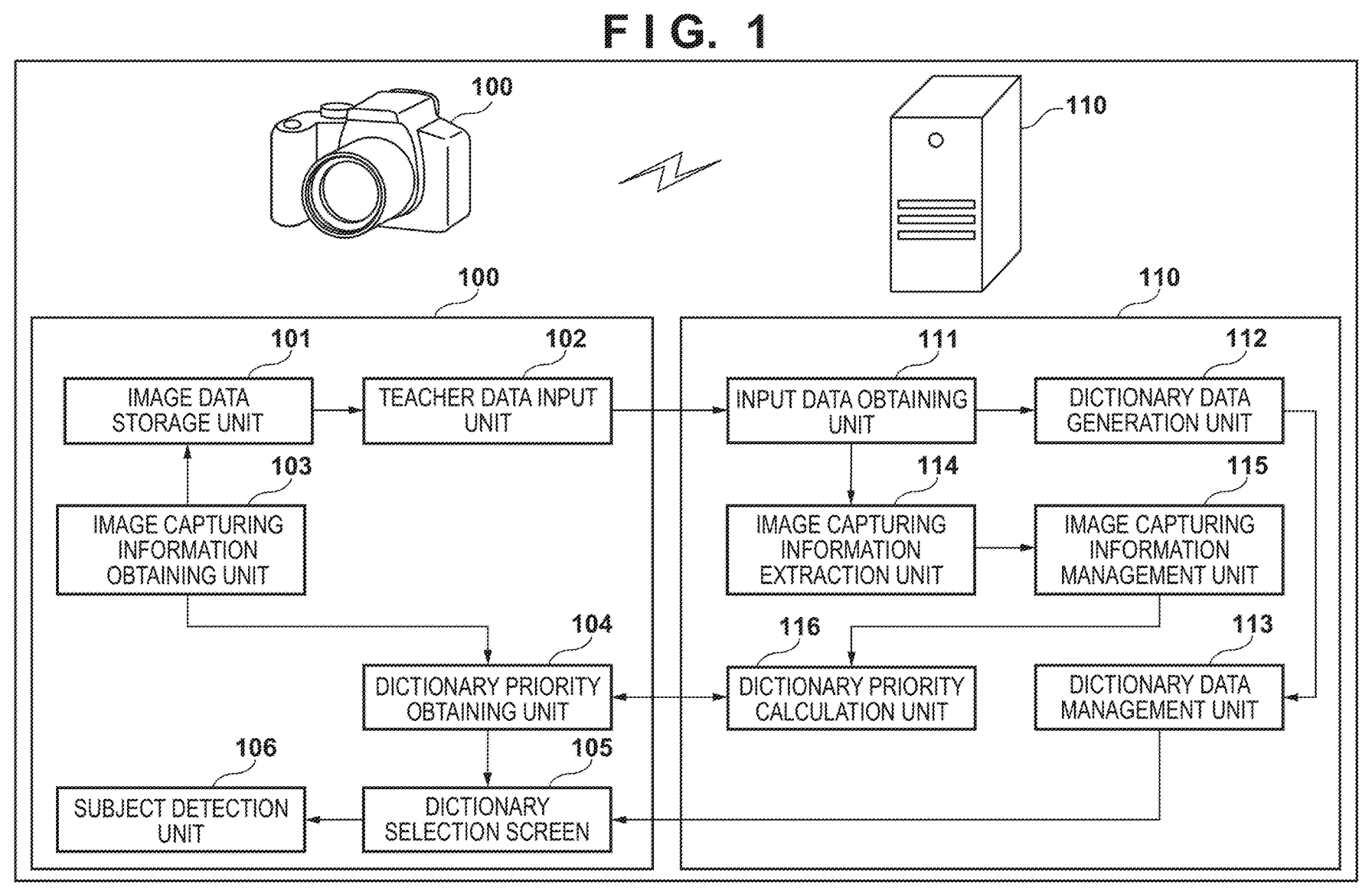

100
110
100
101 IMAGE DATA STORAGE UNIT
102 TEACHER DATA INPUT UNIT
103 IMAGE CAPTURING INFORMATION OBTAINING UNIT
104 DICTIONARY PRIORITY OBTAINING UNIT
105 DICTIONARY SELECTION SCREEN
106 SUBJECT DETECTION UNIT
110
111 INPUT DATA OBTAINING UNIT
112 DICTIONARY DATA GENERATION UNIT
113 DICTIONARY DATA MANAGEMENT UNIT
114 IMAGE CAPTURING INFORMATION EXTRACTION UNIT
115 IMAGE CAPTURING INFORMATION MANAGEMENT UNIT
116 DICTIONARY PRIORITY CALCULATION UNIT

Figure 2:
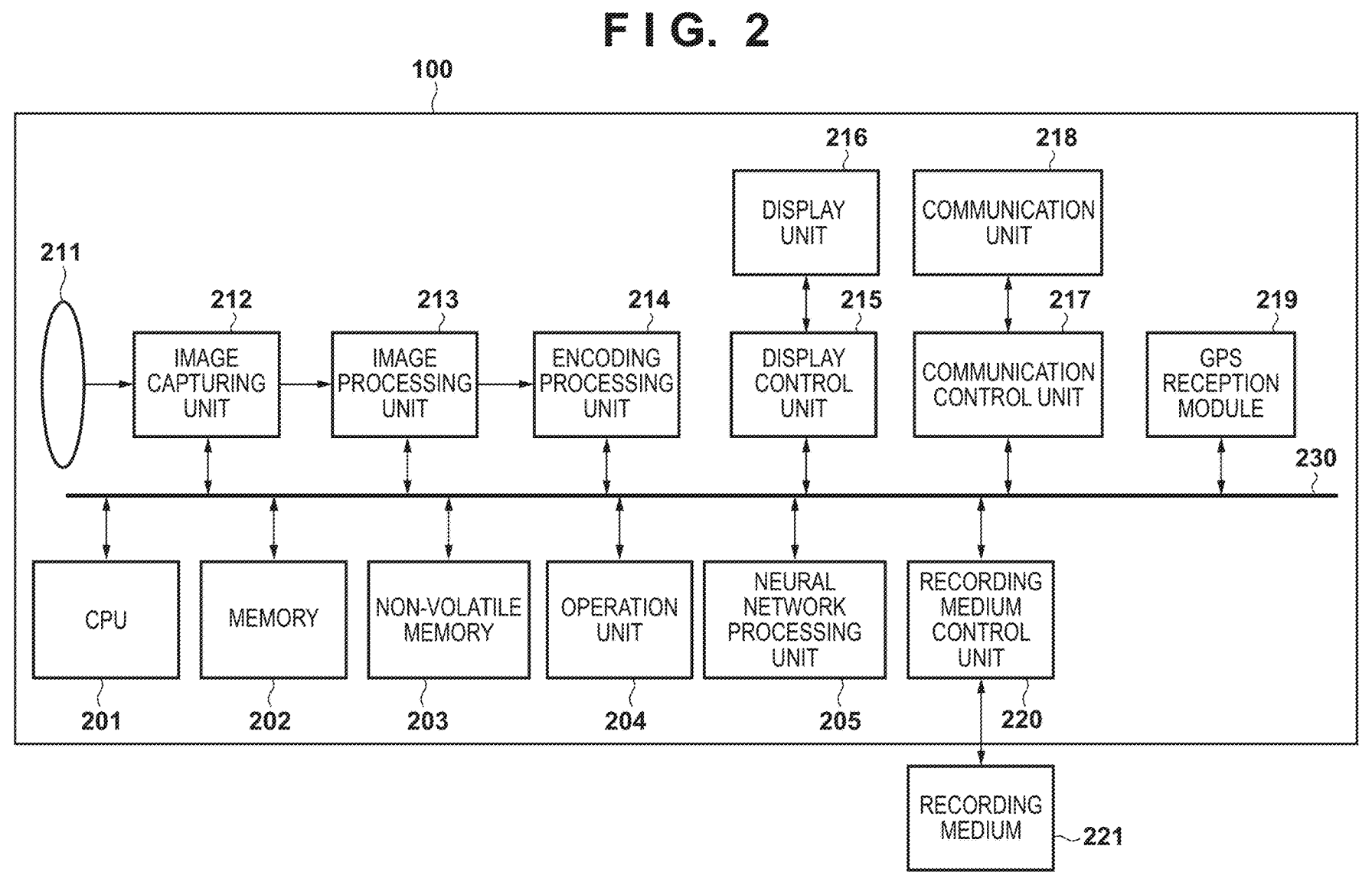

212 IMAGE CAPTURING UNIT

213 IMAGE PROCESSING UNIT

214 ENCODING PROCESSING UNIT

215 DISPLAY CONTROL UNIT

216 DISPLAY UNIT

217 COMMUNICATION CONTROL UNIT

218 COMMUNICATION UNIT

219 GPS RECEPTION MODULE

230

201 CPU

202 MEMORY

203 NON-VOLATILE MEMORY

204 OPERATION UNIT

205 NEURAL NETWORK PROCESSING UNIT

220 RECORDING MEDIUM CONTROL UNIT

221 RECORDING MEDIUM 401
402
403
CPU
MEMORY
DISPLAY UNIT
110
OPERATION UNIT
RECORDING UNIT
COMMUNICATION UNIT
NEURAL NETWORK PROCESSING UNIT
405
406
407
408

501
503
504
TEACHER DATA PROVIDER
DICTIONARY GENERATION
DICTIONARY MANAGEMENT
502
505
DICTIONARY USER
DICTIONARY SELECTION

FIG. 8A

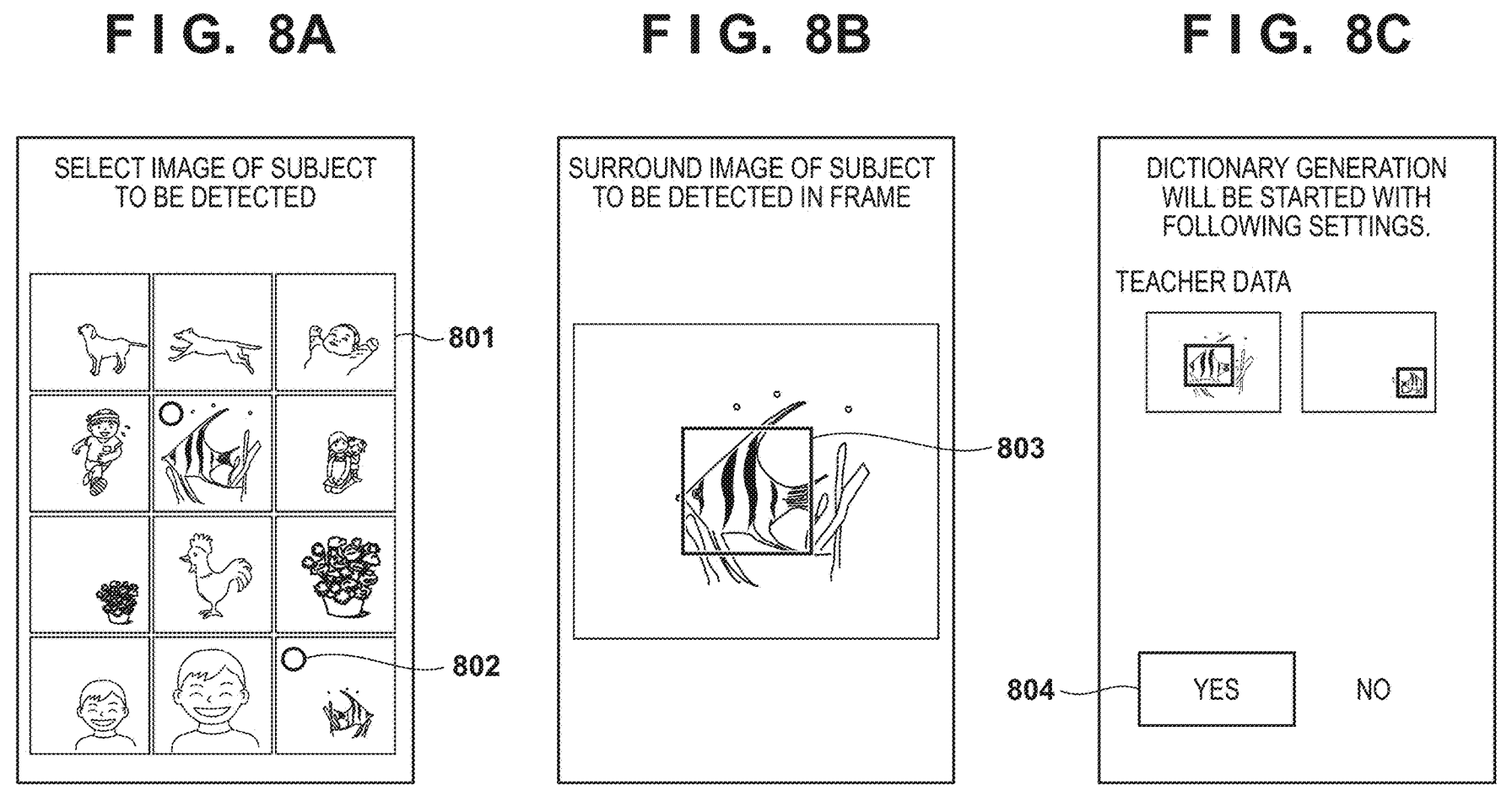

SELECT IMAGE OF SUBJECT TO BE DETECTED

SURROUND IMAGE OF SUBJECT TO BE DETECTED IN FRAME

DICTIONARY GENERATION WILL BE STARTED WITH FOLLOWING SETTINGS.

TEACHER DATA

YES

| DICTIONARY DATA ID | IMAGE CAPTURING LOCATION | IMAGE CAPTURING DATE | IMAGE CAPTURING TIME | WEATHER |
|---|---|---|---|---|
| 00000001 | (P1, P2, P3, ···) | (D1, D2, D3, ···) | (T1, T2, T3, ···) | (W1, W2, W3, ···) |
| | VARIANCE VALUE: Vp | VARIANCE VALUE: Vd | VARIANCE VALUE: Vt | VARIANCE VALUE: Vw |
| | AVERAGE VALUE: Ap | AVERAGE VALUE: Ad | AVERAGE VALUE: At | AVERAGE VALUE: Aw |
| 00000002 | (P1, P2, P3, ···) | (D1, D2, D3, ···) | (T1, T2, T3, ···) | (W1, W2, W3, ···) |
| | VARIANCE VALUE: Vp | VARIANCE VALUE: Vd | VARIANCE VALUE: Vt | VARIANCE VALUE: Vw |
| | AVERAGE VALUE: Ap | AVERAGE VALUE: Ad | AVERAGE VALUE: At | AVERAGE VALUE: Aw |
| ··· | ··· | ··· | ··· | ··· |
| XXXXXXX | (P1, P2, P3, ···) | (D1, D2, D3, ···) | (T1, T2, T3, ···) | (W1, W2, W3, ···) |
| | VARIANCE VALUE: Vp | VARIANCE VALUE: Vd | VARIANCE VALUE: Vt | VARIANCE VALUE: Vw |
| | AVERAGE VALUE: Ap | AVERAGE VALUE: Ad | AVERAGE VALUE: At | AVERAGE VALUE: Aw |

1324
1311
1301
1325
1321
5m
1302
1206

START
S1401
DICTIONARY DATA SELECTED?
NO
YES
S1402
DETECT SUBJECT BASED ON DICTIONARY DATA
S1403
CONTROL IMAGE CAPTURING BASED ON DETECTION RESULTS
S1404
DISPLAY ALERT PROMPTING TO SELECT DICTIONARY DATA
S1405
CONTROL IMAGE CAPTURING WITHOUT USING SUBJECT DETECTION
END

1501
SELECT DICTIONARY TO BE USED
1502

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

In recent years, image capturing apparatuses that detect a subject in an image using a machine learning model typified by a neural network or the like have been known. Such image capturing apparatuses detect a particular subject using a trained machine learning model trained so as to detect a particular subject for which there is a strong need for autofocus functionality, such as a person, an animal, or a vehicle.

Programs describing processing of a machine learning model and trained coefficient parameters are sometimes referred to as dictionary data. A trained machine learning model may vary in a detectable subject and a detection accuracy thereof depending on the training data, and so, when performing subject detection using dictionary data, if desired dictionary data corresponding to an image capturing target and a purpose can be used, the accuracy and convenience of subject detection may improve. Meanwhile, when an enormous amount of dictionary data is stored in a server and dictionary data to be used is obtained from the server, it is not easy to select appropriate dictionary data from the stored dictionary data. Regarding the issue of obtaining appropriate dictionary data, Japanese Patent Laid-Open No. 2021-22081 describes a technique for identifying a sporting event based on schedule information and time information of the sporting event and selecting dictionary data of the identified sporting event in competitive sports photography.

In the technique described in Japanese Patent Laid-Open No. 2021-22081, a configuration is taken so as to identify a sporting event and select dictionary data according to the identified sporting event, but selection of dictionary data without the use of sporting events is not considered.

SUMMARY OF THE INVENTION

The present invention has been made in view of the above issue, and a purpose thereof is to realize a technique that makes it possible to easily select desired dictionary data from existing dictionary data.

In order to solve the aforementioned issues, one aspect of the present disclosure provides an information processing apparatus comprising: an information obtaining unit configured to obtain an image to be used for training and a piece of image capturing information, which is information related to capturing that image; a generation unit configured to generate a piece of dictionary data, which is information identifying an operation of a trained machine learning model, by training a machine learning model using obtained images; a management unit configured to manage, for each generated piece of dictionary data, pieces of image capturing information of images used for training a machine learning model pertaining to that piece of dictionary data in association with that piece of dictionary data; and a selection unit configured to select, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

Another aspect of the present disclosure provides a method of controlling an information processing apparatus, the method comprising: obtaining an image to be used for training and a piece of image capturing information, which is information related to capturing that image; generating a piece of dictionary data, which is information identifying an operation of a trained machine learning model, by training a machine learning model using obtained images: managing, for each generated piece of dictionary data, pieces of image capturing information of images used for training a machine learning model pertaining to that piece of dictionary data in association with that piece of dictionary data; and selecting, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

Still another aspect of the present disclosure provides a non-transitory computer-readable storage medium storing an instruction for executing a method of controlling an information processing apparatus, the method comprising: obtaining an image to be used for training and a piece of image capturing information, which is information related to capturing that image; generating a piece of dictionary data, which is information identifying an operation of a trained machine learning model, by training a machine learning model using obtained images: managing, for each generated piece of dictionary data, pieces of image capturing information of images used for training a machine learning model pertaining to that piece of dictionary data in association with that piece of dictionary data; and selecting, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

According to the present invention, it is possible to easily select desired dictionary data from existing dictionary data.

Further features of the present invention will become apparent from the following description of exemplary embodiments (with reference to the attached drawings).

BRIEF DESCRIPTION OF THE DRAWINGS

FIG. 1 is a block diagram illustrating an example of a configuration of an information processing system according to an embodiment.

FIG. 2 is a block diagram illustrating an example of a configuration of a camera according to the embodiment.

FIGS. 8A to 8C are diagrams illustrating examples of input screens for selecting teacher data according to the embodiment.

FIG. 10 is a diagram illustrating an example of data for managing image capturing information according to the embodiment.

DESCRIPTION OF THE EMBODIMENTS

First Embodiment

Figure 3:
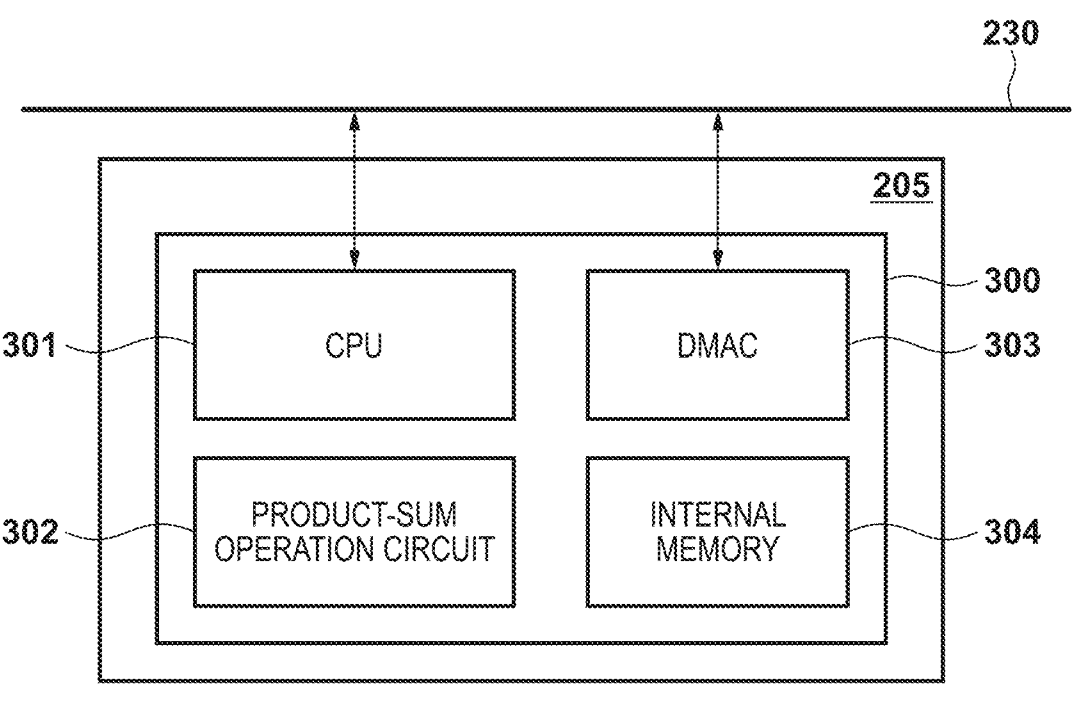
FIG. 3 is a block diagram illustrating an example of a schematic configuration of a neural network processing unit according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration of Information Processing System)

An information processing system according to a first embodiment will be described below with reference to FIG. 1. The information processing system includes, for example, a camera 100, which is an example of an image capturing apparatus, and a server 110, which is an example of an information processing apparatus. In the following description, description will be given using as an example a case where a server capable of storing and providing dictionary data is used as an example of the information processing apparatus, but the present embodiment is applicable not only to a server but also to other electronic devices capable of storing and providing dictionary data. These electronic devices may include, for example, a digital still camera, a digital movie camera, a smartphone, or a tablet computer. Further, electronic devices and the like having an image capturing function such as a network camera, an in-vehicle camera, a drone camera, and a robot-mounted camera may be included. In the present embodiment, dictionary data includes a program describing processing of a machine learning model and trained coefficient parameters. That is, the dictionary data is information for specifying the operation (i.e., inference stage operation) of a trained machine learning model.

The camera 100 and the server 110 are connected by, for example, a wireless communication network. In the information processing system, subject detection in which a machine learning model is used is performed in the camera 100, for example. The machine learning model to be used to detect a subject is constituted by, for example, a neural network, and is, for example, a convolutional neural network (also referred to as CNN). A CNN takes input of an image and executes inference processing using dictionary data, which includes processing parameters and the like. In the inference processing, a result of detecting a subject in the inputted image is outputted for the input image. The dictionary data is generated in advance by training stage processing in which teacher data is used.

The information processing system according to the present embodiment includes a configuration related to processing for generating and managing dictionary data (i.e., including training stage processing), and a configuration related to processing in which dictionary data is used (i.e., including inference stage processing). In the following, a system configuration will be first described in view of processing for generating and managing dictionary data.

In the camera 100, an image data storage unit 101 stores image data. The image data storage unit 101 writes information at the time of image capturing (also simply referred to as image capturing information) obtained by an image capturing information obtaining unit 103 into a dedicated region for each image data. The image capturing information is, for example, information that can be obtained by a sensor or wireless communication in the camera 100, and can include at least one of information related to a location at the time of image capturing, information related to the time of image capturing, and information related to a situation at the time of image capturing. The information related to a location at the time of image capturing is, for example, an image capturing location, and the information related to the time of image capturing includes an image capturing date, an image capturing time, a time zone, a season, and the like. Further, the information related to a situation at the time of image capturing includes weather at the time of image capturing and the like. The image data storage unit 101 transmits the stored image data to a teacher data input unit 102.

The teacher data input unit 102 transmits image data and subject region information of the image data in which a target subject is present as one set of teacher data to the server 110. The teacher data input unit 102 can input a plurality of sets of teacher data and transmit these to the server 110.

In the server 110, an input data obtaining unit 111 obtains image data, which includes image capturing information, and subject region information transmitted from the teacher data input unit 102. The input data obtaining unit 111 transmits the image data and the subject region information in the obtained data to a dictionary data generation unit 112. The dictionary data generation unit 112 generates dictionary data by training a machine learning model using the image data and the subject region information. For example, the dictionary data generation unit 112 of the present embodiment generates custom dictionary data in a form in which additional training (also referred to as fine tuning) is performed on pre-trained base dictionary data such that accurate dictionary data can be generated even with a small amount of teacher data. A training method is not limited to a method of the present embodiment, and a method in which a base dictionary is not used may be used.

A dictionary data management unit 113 receives dictionary data generated by the dictionary data generation unit 112 and manages the received dictionary data together with other similarly generated dictionary data. The dictionary data management unit 113 assigns a dictionary data ID to generated dictionary data and manages the dictionary data so as to be distinguishable from other dictionary data.

Meanwhile, image capturing information added to image data is extracted from the image data by an image capturing information extraction unit 114 and transmitted to an image capturing information management unit 115. The image capturing information management unit 115 associates a dictionary data ID of dictionary data, which has been generated using image data to which corresponding image capturing information has been added, with the image capturing information and manages both. That is, the image capturing information management unit 115 manages, for each piece of generated dictionary data, image capturing information of images used to train a machine learning model pertaining to that dictionary data in association with that dictionary data.

Next, the system configuration will be described in view of processing in which dictionary data is used. A dictionary priority obtaining unit 104 of the camera 100 can obtain a dictionary data priority by inputting image capturing information, which can be obtained by the image capturing information obtaining unit 103, and communicating with the server 110. The dictionary data priority indicates a dictionary data priority with respect to the current image capturing environment of a user of dictionary data.

In the server 110, after image capturing information is received from the camera 100, a dictionary priority calculation unit 116 obtains image capturing information associated with a plurality of pieces of dictionary data from the image capturing information management unit 115 and calculates a dictionary data priority. Processing for calculating a dictionary data priority will be described later.

Regarding a dictionary selection screen 105 of the camera 100, a plurality of pieces of dictionary data information are obtained from the dictionary data management unit 113 of the server 110 and are displayed on the dictionary selection screen 105. At this time, regarding the dictionary selection screen 105, a priority of each piece of dictionary data obtained by the dictionary priority obtaining unit 104 is reflected in the dictionary selection screen 105. By this, the user can easily select dictionary data suitable for the current image capturing environment. The dictionary selection screen 105 will be described later in detail.

A subject detection unit 106 performs inference processing using a CNN based on dictionary data selected by the user on the dictionary selection screen 105. A detection result obtained by the inference processing is used for image capturing control (autofocus, exposure control, etc.).

The configuration of the information processing system illustrated in FIG. 1 is not limited to the configuration according to the camera 100 and the server 110. For example, the information processing system may be configured so as to be capable of executing all the above processes in the camera 100 or may be configured to execute input of teacher data in a mobile terminal such as a smartphone instead of the camera 100.

With such an information processing system, the user using the camera 100 can provide teacher data to generate dictionary data useful for their image capturing and easily select desired dictionary data from dictionary data present on the server 110. More progressively, for example, a use case in which the user creates dictionary data reflecting their preference, uploads the dictionary data on a server, and shares the dictionary data with other users may be realized. In such a case, a business model in which a company secures new customers by managing uploaded dictionary data and providing it to users can be expected.

The configuration illustrated in the camera 100 of FIG. 1 can be realized by a CPU 201 illustrated in FIG. 2 executing a program or the CPU 201 controlling each unit illustrated in FIGS. 2 and 3. Further, processing realized by the configuration illustrated in the camera 100 of FIG. 1 corresponds to, for example, processes illustrated in FIGS. 6, 7, and 14, and will be described in detail with reference to these drawings. The configuration illustrated in the server 110 of FIG. 1 can be realized by a CPU 401 illustrated in FIG. 4 executing a program or the CPU 401 controlling each unit illustrated in FIG. 4. Processing realized by the configuration illustrated in the server 110 of FIG. 1 corresponds to, for example, processes illustrated in FIGS. 9 and 11, and will be described in detail with reference to these drawings.

One or more of the functional blocks illustrated in the following drawings may be realized by hardware such as an ASIC or a programmable logic array (PLA) or may be realized by a programmable processor such as a CPU or a MPU executing software. Further, they may be realized by a combination of software and hardware.

(Camera Configuration)

An example of a configuration of the camera 100 will be described with reference to FIG. 2. For example, the camera 100 includes the CPU 201, a memory 202, a non-volatile memory 203, an operation unit 204, a neural network processing unit 205, an image capturing unit 212, an image processing unit 213, and an encoding processing unit 214. The camera 100 further includes a display control unit 215, a display unit 216, a communication control unit 217, a communication unit 218, a GPS reception module 219, a recording medium control unit 220, an internal bus 230, and an image capturing lens 211.

The camera 100 forms an optical image of a subject on a pixel array of the image capturing unit 212 using the image capturing lens 211. The image capturing lens 211 may or may not be capable of being attached to and detached from a body (housing or main body) of the camera 100. The camera 100 writes and reads image data to and from a recording medium 221 via the recording medium control unit 220. The recording medium 221 may or may not be capable of being attached to and detached from the camera 100.

The CPU 201 includes one or more processors and controls the operation of each unit (each functional block) of the camera 100 via the internal bus 230 by executing a computer program stored in the non-volatile memory 203.

The memory 202 is, for example, a rewritable volatile storage medium. The memory 202 temporarily records a computer program for controlling the operation of each unit of the camera 100, information such as parameters related to the operation of each unit of the camera 100, information received by the communication control unit 217, and the like. The memory 202 temporarily records an image obtained by the image capturing unit 212 and an image and information processed by the image processing unit 213, the encoding processing unit 214, and the like. The memory 202 includes enough storage capacity to temporarily record these.

The non-volatile memory 203 is a non-volatile storage medium that can be electrically erased and recorded and includes, for example, an EEPROM, a hard disk, and the like. The non-volatile memory 203 stores information such as parameters related to the operation of each unit of the camera 100 and a computer program for controlling the operation of each unit of the camera 100. Various operations to be performed by the camera 100 are realized by a corresponding computer program. Further, the non-volatile memory 203 stores trained coefficient parameters such as weight coefficients and bias values and a computer program describing processing contents of a neural network to be used by the neural network processing unit 205. The computer program describing processing of a neural network and the trained coefficient parameters correspond to dictionary data for subject detection.

A weight coefficient is a value for indicating a strength of a connection between nodes in a neural network, and a bias is a value for giving an offset to an accumulated value of weight coefficients and input data. The non-volatile memory 203 can hold a plurality of trained coefficient parameters and a plurality of computer programs describing processing of the neural network. A plurality of computer programs describing the processing of the neural network and a plurality trained coefficient parameters may be temporarily stored in the memory 202.

The operation unit 204 provides a user interface for operating the camera 100. The operation unit 204 includes various buttons such as a power button, a menu button, a release button for image capturing, a moving image recording button, and a cancel button, and the various buttons are constituted by a switch, a touch panel, and the like. The CPU 201 controls the camera 100 according to a user instruction inputted via the operation unit 204. Here, description has been given using as an example a case where the CPU 201 controls the camera 100 based on an operation inputted via the operation unit 204, but the present invention is not limited thereto. For example, the CPU 201 may control the camera 100 based on a request inputted from a remote controller (not illustrated) or a mobile terminal via the communication unit 218.

The neural network processing unit 205 performs inference processing of the subject detection unit 106 based on dictionary data. A configuration of the neural network processing unit 205 will be described later with reference to FIG. 3.

The image capturing lens 211 includes a lens unit and is constituted by, for example, a lens group including a zoom lens, a focus lens, and the like, a lens control unit (not illustrated), a diaphragm (not illustrated), and the like. The image capturing lens 211 may function as a zoom unit for changing the angle of view. The lens control unit of the image capturing lens 211 adjusts focus and controls an aperture value (f-number) according to a control signal transmitted from the CPU 201.

The image capturing unit 212 may function as an obtaining unit for sequentially obtaining a plurality of images including a moving image. As the image capturing unit 212, for example, a charge-coupled device (CCD) image sensor, a complementary metal-oxide semiconductor (CMOS) image sensor, or the like is used. The image capturing unit 212 includes a pixel array (not illustrated) in which photoelectric conversion units (pixels) for converting an optical image of a subject into an electrical signal are arranged in a matrix, that is, two-dimensionally. An optical image of a subject is formed on the pixel array by the image capturing lens 211. The image capturing unit 212 outputs a captured image to the image processing unit 213 or the memory 202. The image capturing unit 212 can also obtain a still image.

The image processing unit 213 performs predetermined image processing on image data outputted from the image capturing unit 212 or image data read from the memory 202. Examples of the image processing include dynamic range conversion processing, interpolation processing, reduction processing (resizing processing), color conversion processing, and the like. Further, the image processing unit 213 performs predetermined computational processing for exposure control, distance measurement control, and the like using image data obtained by the image capturing unit 212.

When computational processing by the image processing unit 213 is performed, the CPU 201 performs exposure control, distance measurement control, and the like based on a computational result obtained by the computational processing. For example, the CPU 201 performs auto exposure (AE) processing, auto white balance (AWB) processing, auto focus (AF) processing, and the like. These image capturing controls are performed by referring to a result of subject detection by the neural network processing unit 205.

The encoding processing unit 214 compresses the size of image data from the image processing unit 213 by performing intra-frame predictive coding (intra-screen predictive coding), inter-frame predictive coding (inter-screen predictive coding), and the like on the image data.

The display control unit 215 controls the display unit 216. The display unit 216 includes a display screen (not illustrated). The display control unit 215 generates an image signal that can be displayed on the display screen of the display unit 216 and outputs the image signal to the display unit 216. The display control unit 215 is capable of not only outputting image data to the display unit 216 but also outputting image data to an external device via the communication control unit 217.

The display unit 216 includes an on screen display (OSD) function of displaying a setting screen such as a menu on the display screen. The display control unit 215 may superimpose an OSD image on an image signal and output the image signal to the display unit 216. The display unit 216 may display a subject frame based on a result of subject detection by the neural network processing unit 205 in a superimposed manner on an image signal in response to, for example, an instruction from the CPU 201 or the display control unit 215. The display unit 216 may be constituted by, for example, a liquid crystal display, an organic EL display, or the like, and displays an image signal transmitted from the display control unit 215. The display unit 216 may include, for example, a touch panel. When the display unit 216 includes a touch panel, the display unit 216 can also function as the operation unit 204.

The communication control unit 217 operates according to an instruction from the CPU 201 and, for example, generates a modulated signal conforming to a wireless communication standard such as IEEE 802.11 and outputs the modulated signal to the communication unit 218 and receives a modulated signal from an external device via the communication unit 218. The communication control unit 217 can transmit and receive a control signal for a video signal. For example, the communication unit 218 may be controlled to transmit a video signal conforming to a communication standard such as High Definition Multimedia Interface (HDMI)® or Serial Digital Interface (SDI).

The communication unit 218 converts a video signal and a control signal into physical electrical signals and transmits and receives the physical electrical signals to and from an external device. In addition to transmitting and receiving a video signal and a control signal, the communication unit 218 receives dictionary data for subject detection in the neural network processing unit 205 from the server 110 and transmits teacher data to the server 110. The communication unit 218 also receives information such as an image capturing date, an image capturing time, and weather at the time of image capturing to be used as image capturing information.

The GPS reception module 219 can obtain position information of the camera 100. The position information obtained in the GPS reception module 219 is added to image data as image capturing information at the time of capturing teacher data. The obtainment of position information is not limited to a case where GPS is used, and another configuration may be used so long as an image capturing location can be identified.

The recording medium control unit 220 controls writing of data to the recording medium 221 and reading of data from the recording medium 221. The recording medium control unit 220 outputs a control signal for controlling the recording medium 221 to the recording medium 221 based on a request from the CPU 201. As the recording medium 221, for example, a non-volatile memory, a magnetic disk, or the like is used. As described above, the recording medium 221 may or may not be capable of being attached to and detached from the camera 100. The recording medium 221 stores encoded image data and the like as files in a format conforming to a file system of the recording medium 221.

The internal bus 230 controls transmission and reception of data between the respective functional blocks 201 to 205, 212 to 215, 217, and 219 to 220 of the camera 100. One or more of the functional blocks illustrated in FIG. 2 is realized by the CPU 201 serving as a computer included in the camera 100 executing a computer program stored in the non-volatile memory 203 or the like serving as a storage medium.

FIG. 3 illustrates an example of a schematic configuration of the neural network processing unit 205. As illustrated in FIG. 3, the neural network processing unit 205 includes a CPU 301, a product-sum operation circuit 302, a dynamic memory access controller (DMAC) 303, an internal memory 304, and the like in a neural core 300.

The CPU 301 obtains dictionary data from the memory 202 or the non-volatile memory 203 via the internal bus 230 or from the internal memory 304 and executes the dictionary data. The CPU 301 also controls the product-sum operation circuit 302 and the DMAC 303.

The product-sum operation circuit 302 is a circuit for performing a product-sum operation in a neural network. The product-sum operation circuit 302 includes a plurality of product-sum operation units and is capable of executing product-sum operations in parallel. The product-sum operation circuit 302 outputs intermediate data calculated when the plurality of product-sum operation units execute product-sum operations in parallel to the internal memory 304 via the DMAC 303.

The DMAC 303 is a circuit for performing data transfer without going through the CPU 301, and performs data transfer with the memory 202 or the non-volatile memory 203 via the internal bus 230 and with the internal memory 304. Further, the DMAC 303 also transfers data between the product-sum operation circuit 302 and the internal memory 304. The data transferred by the DMAC 303 includes a computer program describing processing contents of a neural network and trained coefficient parameters (i.e., dictionary data), intermediate data calculated by the product-sum operation circuit 302, and the like.

The internal memory 304 stores the above dictionary data, intermediate data calculated by the product-sum operation circuit 302, and the like. The internal memory 304 may include a plurality of banks and may dynamically switch banks.

(Configuration of Server)

Figures 4, 5:
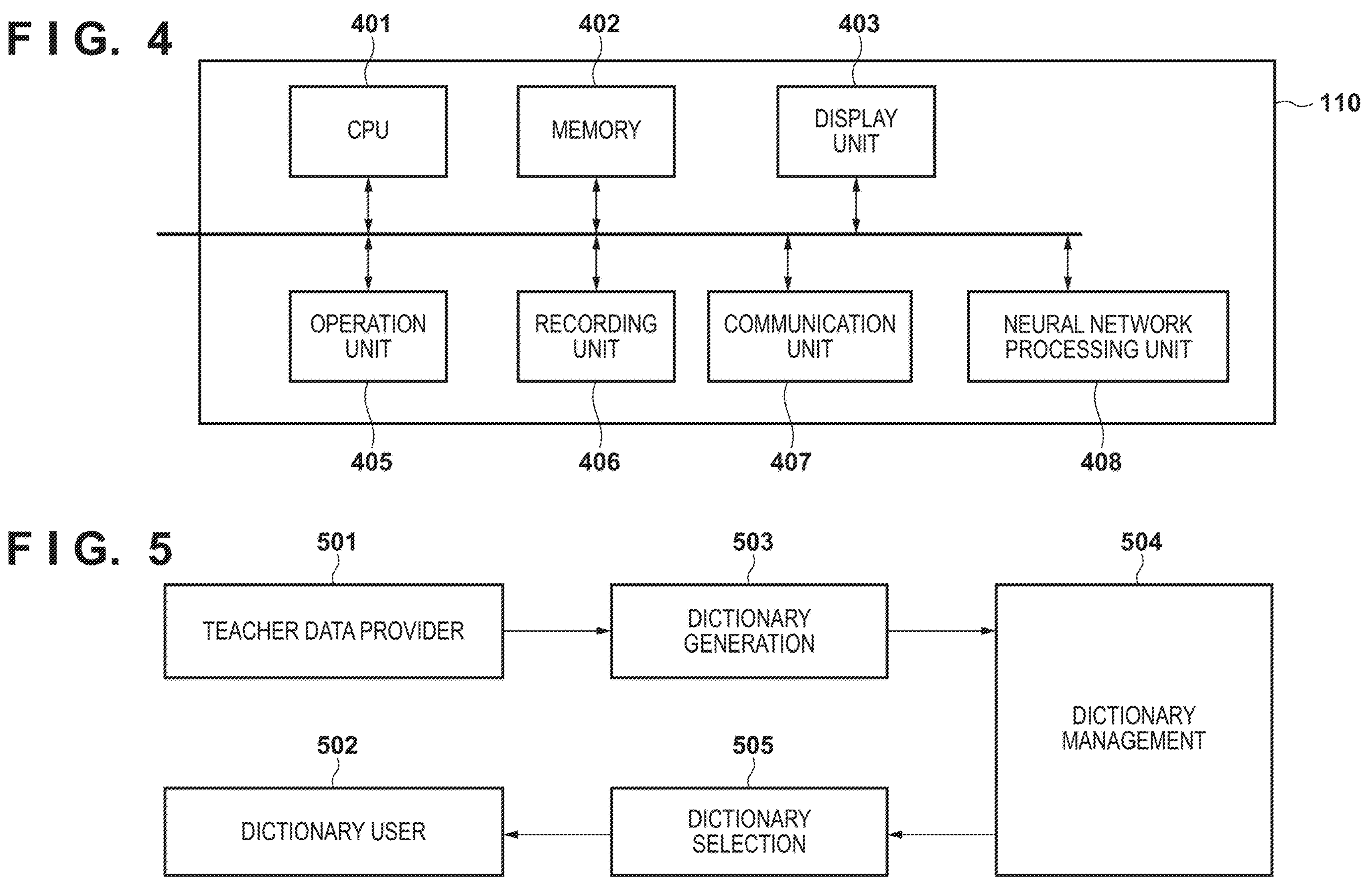
FIG. 4 is a block diagram illustrating an example of a configuration of a server according to the embodiment.
FIG. 5 is a dataflow diagram illustrating a use case according to the embodiment.

Next, an example of a configuration of the server 110 will be described with reference to FIG. 4. As one example, the server 110 includes the CPU 401, a memory 402, a display unit 403, an internal bus 404, an operation unit 405, a recording unit 406, a communication unit 407, and a neural network processing unit 408. Some of the functional blocks illustrated in FIG. 4 may be realized by the CPU 401 serving as a computer included in the server 110 executing a computer program stored in the recording unit 406 or the like serving as a storage medium.

The CPU 401 executes various processes in the server 110 by executing a computer program stored in the recording unit 406. The memory 402 includes, for example, a volatile storage medium, and is mainly used as a work area of the CPU 401 and a temporary buffer region for data.

The display unit 403 is constituted by, for example, a liquid crystal panel, an organic EL panel, or the like, and displays a screen for settings or the like based on an instruction from the CPU 401. Instead of including the display unit 403, the server 110 may output information to be displayed to an external device via the communication unit 407.

The internal bus 404 is a bus for connecting the respective processing blocks in the server 110 to each other. The operation unit 405 is constituted by a keyboard, a mouse, a button, a touch panel, a remote controller, or the like and receives an operation instruction from the user. The operation information inputted from the operation unit 405 is transmitted to the CPU 401, and the CPU 401 controls the respective processing blocks based on the operation information. Instead of including the operation unit 405, the server 110 may obtain operation information from an external device via the communication unit 407.

The recording unit 406 includes, for example, a non-volatile storage medium, and stores and reads various types of data in the storage medium based on an instruction from the CPU 401. The storage medium is constituted by, for example, an EEPROM, a built-in flash memory, a built-in hard disk, a removable memory card, or the like. In addition to the computer program, the recording unit 406 stores teacher data to be used for training at the neural network processing unit 408, dictionary data that has already been generated, and the like.

The communication unit 407 includes hardware and the like for performing wireless LAN and wired LAN communication. In wireless LAN, for example, processing according to an IEEE 802.11n/a/g/b method is performed. The communication unit 407 connects to an external access point by wireless LAN and performs wireless LAN communication with another wireless communication device via the access point. In wired LAN, the communication unit 407 performs communication via an external router or a switching hub using an Ethernet cable or the like. The communication unit 407 communicates with external devices including the camera 100 and exchanges information such as teacher data and dictionary data.

The neural network processing unit 408 performs training stage processing of a neural network using teacher data obtained via the communication unit 407. The neural network processing unit 408 performs training processing for constructing dictionary data corresponding to respective subjects of different classes using the teacher data. The neural network processing unit 408 may be constituted by a graphics processing unit (GPU), a digital signal processor (DSP), and the like. The dictionary data which is a result of training processing performed by the neural network processing unit 408 is held in the recording unit 406.

(Processing in Information Processing System)

Next, processing of the information processing system according to the present embodiment will be described. As described above, the information processing system according to the present embodiment performs processing for generating and managing dictionary data and processing in which dictionary data is used. FIG. 5 illustrates a dataflow assuming a use case for explaining the above two processes. In the example illustrated in FIG. 5, description will be given using as an example a case where there are two parties, a teacher data provider 501 and a dictionary user 502, but the teacher data provider 501 and the dictionary user 502 may be the same person.

The teacher data provider 501 designates teacher data using the camera 100. The designated teacher data is transmitted from the camera 100 to the server 110. The server 110 performs dictionary generation 503 using the received teacher data. The generated dictionary data is managed by dictionary management 504. Meanwhile, the dictionary user 502 can obtain dictionary data managed by the dictionary management 504 through dictionary selection 505 by the server 110 and use the dictionary data in the camera 100.

Next, processing related to the dictionary generation 503 and the dictionary management 504 in FIG. 5 will be described in detail. Specifically, the camera 100 associates image capturing information with an image to be used as teacher data (processing illustrated in FIG. 6; corresponds to the image capturing information obtaining unit 103 and the image data storage unit 101), and then generates teacher data and transmits the teacher data to the server (processing illustrated in FIG. 7; corresponds to the teacher data input unit 102).

Figure 9:
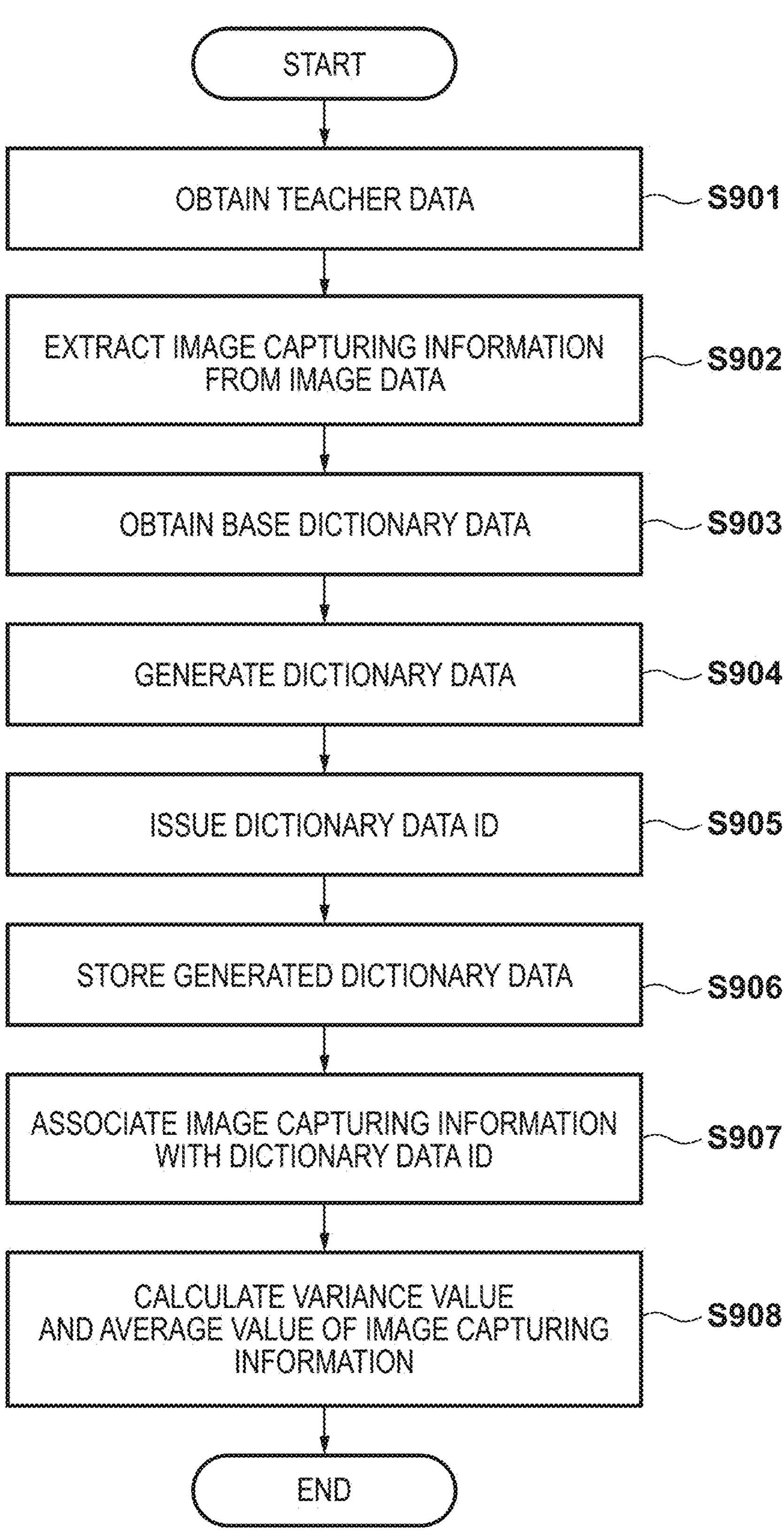
FIG. 9 is a flowchart for explaining a series of operations of processing related to generation and management of dictionary data according to the embodiment.

Then, in part of the processing illustrated in FIG. 9, the server 110 generates dictionary data using the obtained teacher data (corresponds to the input data obtaining unit 111, the image capturing information extraction unit 114, and the dictionary data generation unit 112). That is, these processes correspond to the dictionary generation 503 illustrated in FIG. 5. Further, in other processing illustrated in FIG. 9, the server 110 adds statistical information and an ID, which will be described later, to the generated dictionary data and stores the generated dictionary data together with image capturing information (corresponds to the image capturing information management unit 115 and the dictionary data management unit 113). That is, these operations correspond to the dictionary management 504 illustrated in the above FIG. 5.

(Processing for Associating Image Capturing Information with Image)

Figure 6:
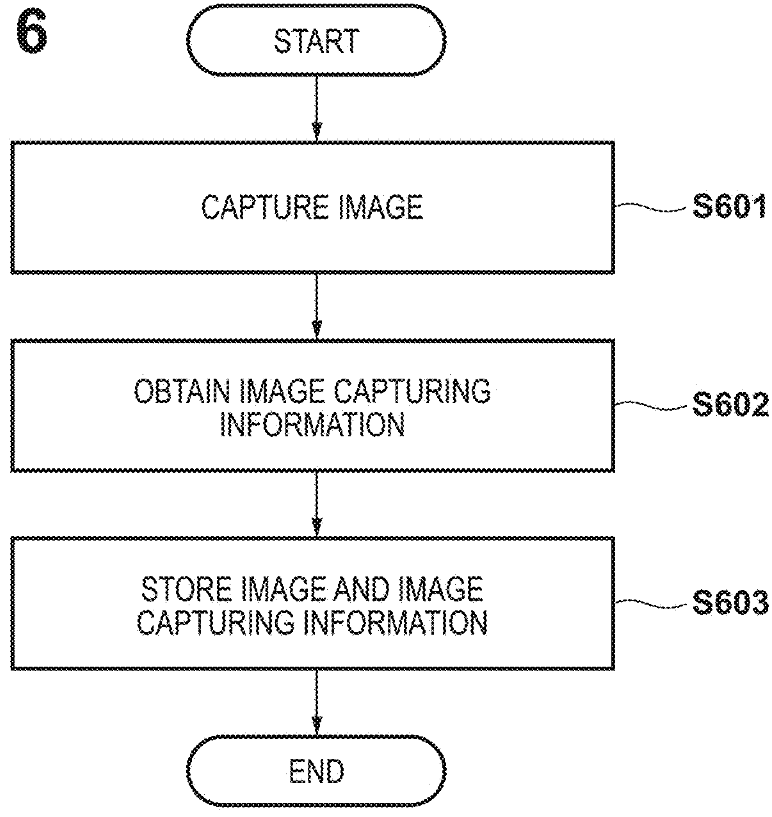
FIG. 6 is a flowchart for explaining a series of operations of processing for associating image capturing information with an image according to the embodiment.

Processing for associating image capturing information with an image to be used as teacher data in the camera 100 will be described with reference to FIG. 6. This processing is realized by a computer program stored in the non-volatile memory 203 being loaded into the memory 202 and the CPU 201 reading and executing the computer program in the memory 202 while the camera 100 is powered on.

In step S601, the image capturing unit 212 captures an image in response to an instruction from the CPU 201. The image captured in step S601 is processed by, for example, the image processing unit 213, the encoding processing unit 214, and the like, and then, for example, is temporarily recorded in the recording medium 221 or the like.

In step S602, the communication unit 218 and the GPS reception module 219 obtains image capturing information (i.e., image capturing location, image capturing date, image capturing time, weather, etc.) in response to an instruction of the CPU 201.

In step S603, the CPU 201 outputs the image recorded in step S601 and the image capturing information obtained in step S602 to the recording medium 221, collected into a single file, for example. The processing for collecting an image and image capturing information into a single file may be performed by, for example, writing the image capturing information in a predetermined region of an image file. As described above, in the present embodiment, the camera 100 generates data in which an image is associated with image capturing information for when that image was captured. By this, when image capturing information associated with training data is handled in the server 110, it is possible to easily and quickly extract image capturing information corresponding to an image. A captured image and image capturing information need not necessarily be included in a single file, and a captured image need only be associated with image capturing information. The CPU 201 then terminates the processing.

(Processing Pertaining to Generation and Transmission of Teacher Data)

Figure 7:
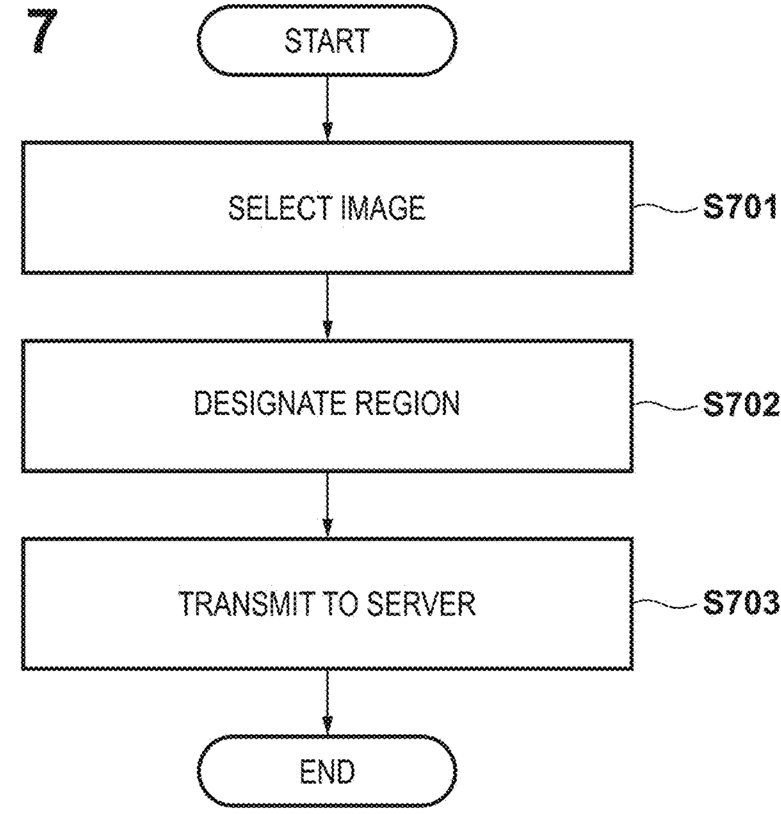
FIG. 7 is a flowchart for explaining a series of operations of processing related to generation and transmission of teacher data according to the embodiment.

Next, processing pertaining to generation and transmission of teacher data in the camera 100 will be described with reference to FIG. 7. The operation illustrated in FIG. 7 relates to a flow of inputting information indicating a ground truth of a subject region in the camera 100 and notifying the server 110 of the start of training. This processing is also realized by a computer program stored in the non-volatile memory 203 being loaded into the memory 202 and the CPU 201 reading and executing the computer program in the memory 202 while the camera 100 is powered on.

In step S701, the operation unit 204 receives a user operation for selecting an image to be used as teacher data from captured images stored in the recording medium 221. FIGS. 8A to 8C illustrate examples of an input screen, for selecting an image to be used as teacher data, to be displayed on the display unit 216. In the example illustrated in FIG. 8A, 12 captured images 801 stored in the recording medium 221 are displayed. The user can select (one or more pieces of) teacher data from the displayed captured images by, for example, touching the operation unit 204. The CPU 201 displays an indication (e.g., circular region 802) indicating whether an image is selected, for example, on the upper left of a captured image. When it is indicated that an image is selected, that captured image is a teacher data image.

In step S702, the operation unit 204 receives, for an image selected as teacher data, a user operation for designating a subject region in the image. FIG. 8B illustrates an example of an input screen, for a subject region, to be displayed on the display unit 216. In FIG. 8B, a rectangular frame 803 indicates a subject region inputted by the user. The CPU 201 sets a subject region for each image selected as teacher data. As a method of setting a subject region, a region may be directly selected in a displayed image via a touch panel, which is a part of the operation unit 204 and is integrated with the display unit 216. Alternatively, selection may be made by simply making selection from or fine-tuning subject frames detected by the CPU 201 or the like using features such as edges.

In step S703, the operation unit 204 receives a user operation for starting generation of dictionary data. FIG. 8C illustrates an example of a confirmation screen, for starting generation of dictionary data, to be displayed on the display unit 216. The user inputs "YES" or "NO" in the confirmation screen. When "YES" indicated by reference numeral 804 is selected, the CPU 201 transmits teacher data to the server 110 via the communication unit 218. At this time, the CPU 201 associates image data with subject region information of the image data in which a subject is present and transmits these to the server 110 as one set of teacher data. The CPU 201 may write the subject region information in a predetermined region of the image data or may assume the image data and the subject region information to be separate pieces of information. A plurality of subject images may be selected as illustrated in FIGS. 8A to 8C. Thus, the CPU 201 may transmit as many sets of teacher data in which selected image data is associated with subject region information to the server 110 as the number of selected subject images. When the teacher data and the like are transmitted to the server 110, dictionary data to be described later is generated in the server 110. When "NO" is selected in the example illustrated in FIG. 8C, the CPU 201 ends the processing without transmitting the teacher data to the server 110.

(Processing for Generating and Managing Dictionary Data)

Next, processing for generating and managing dictionary data in the server 110 will be described with reference to FIG. 9. This processing is realized by a computer program stored in the recording unit 406 being loaded into the memory 402 and the CPU 401 reading and executing the computer program in the memory 402.

In step S901, the CPU 401 of the server 110 obtains teacher data from the camera 100 via the communication unit 407. In step S902, the CPU 401 extracts image capturing information from image data included in the obtained teacher data. Then, the CPU 401 holds the extracted image capturing information (e.g., in the image capturing information management unit 115 configured in the memory 402).

In step S903, the CPU 401 obtains base dictionary data for training. For example, dictionary data obtained by learning a wide variety of objects in advance can be set as an initial value as the base dictionary data. Alternatively, dictionary data obtained by learning a particular subject such as dog, cat, or motorcycle may be used as the base dictionary data.

In step S904, the neural network processing unit 408 generates dictionary data in response to an instruction from the CPU 401. For example, the neural network processing unit 408 trains a machine learning model using teacher data including the teacher data obtained in step S901 and thereby obtains trained coefficient parameters. At this time, regarding coefficient parameters of the machine learning model at the time of starting training, coefficient parameters included in the base dictionary data can be used. The neural network processing unit 408 assumes, as newly generated dictionary data, a program describing processing of the used machine learning model and the trained coefficient parameters obtained by training. The trained coefficient parameters obtained here provides dictionary data for more accurately detecting a subject included in an image obtained from the camera 100 or a subject similar to that subject. Step S904 functions as a training method for generating customized dictionary data. In step S905, the CPU 401 issues, for the generated dictionary data, a dictionary data ID for identifying dictionary data. A dictionary data ID is, for example, a numerical value unique to each dictionary.

In step S906, the CPU 401 stores the generated dictionary data in the dictionary data management unit 113 configured in the memory 402 (or the recording unit 406). Regarding dictionary data managed by the dictionary data management unit 113, predetermined dictionary data can be obtained by designating a dictionary data ID. At this time, the CPU 401 converts one of the images in the teacher data obtained in step S901 into a thumbnail image to be displayed on a dictionary selection screen to be described later and stores the thumbnail image in the dictionary data management unit 113. The thumbnail image to be stored may have been designated in advance in the camera 100 by the user who generated the dictionary data or may be automatically selected by the server 110.

In step S907, the CPU 401 stores the image capturing information obtained in step S902 and the dictionary data ID issued in step S905 in the memory 402 (or the recording unit 406) in association with each other. A method of managing image capturing information will be described with reference to FIG. 10.

FIG. 10 illustrates an example of image capturing information associated with a dictionary data ID in step S907. Dictionary data ID, image capturing location, image capturing date, image capturing time, and weather data are managed in a column direction of a table. In a row direction, for each dictionary data ID, a variance value and an average value of each element of image capturing information are managed. Each element of image capturing information associated with a respective dictionary data ID has the same number of pieces of information as image data used as teacher data and is managed in an array.

In step S908, the CPU 401 calculates a variance value and an average value of image capturing information managed for each dictionary data ID. Regarding the weather of image capturing information according to the present embodiment, it is possible to quantify a variance value and an average value by quantifying sunny to rainy in a stepwise manner according to the amount of cloud or the like and managing it as image capturing information. The CPU 401 then terminates the processing for generating and managing dictionary data.

(Dictionary Data Priority Decision Processing)

Figure 11:
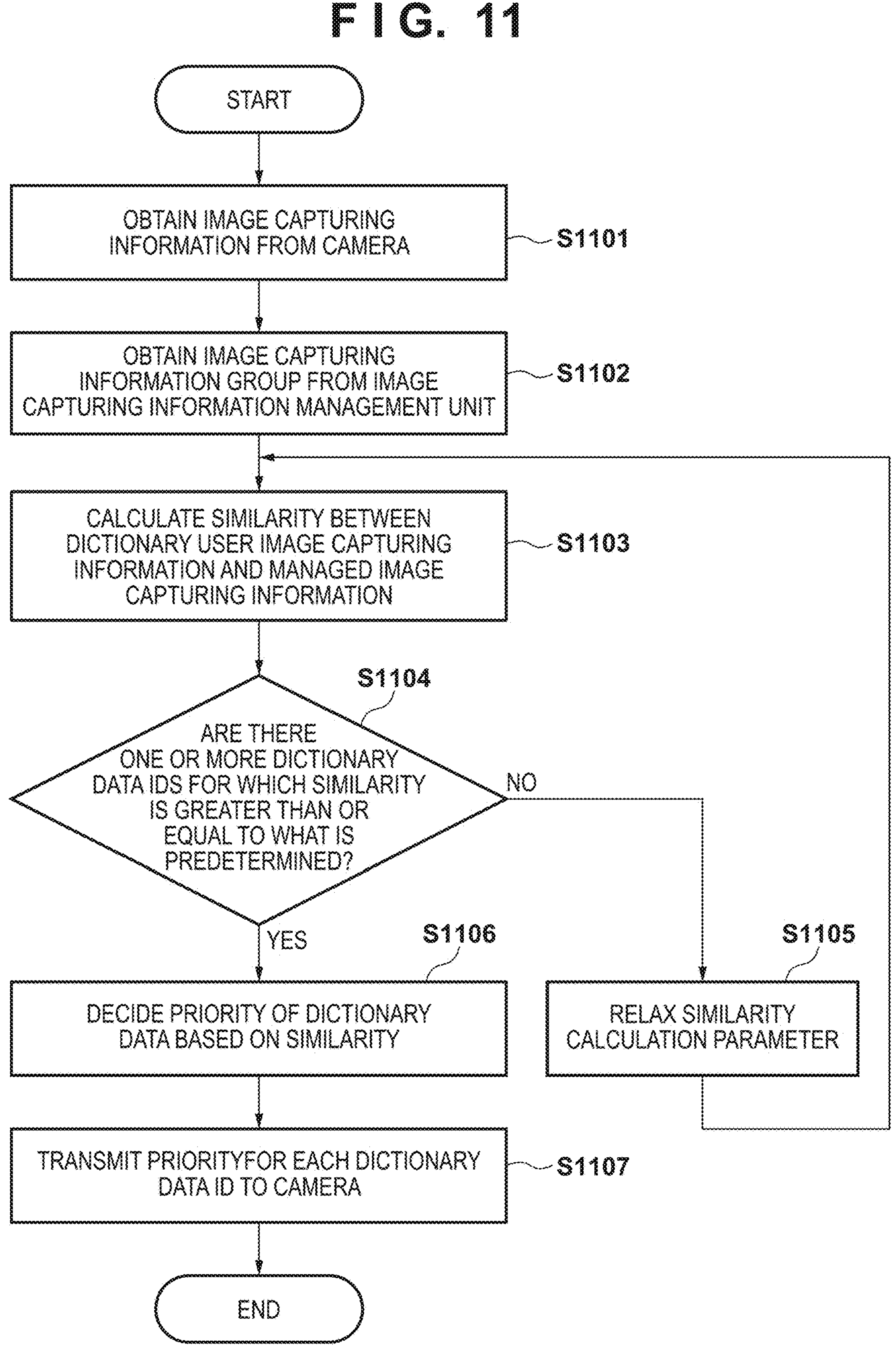
FIG. 11 is a flowchart for explaining a series of operations of processing for deciding a dictionary data priority according to the embodiment.

Next, processing for deciding priorities of a plurality of dictionaries managed by the server 110 based on image capturing information obtained by the camera 100 will be described with reference to FIG. 11. The processing to be described here corresponds to processing of obtaining appropriate dictionary data from dictionary data managed in the dictionary management 504 (illustrated in FIG. 5) through the dictionary selection 505 (corresponds to the dictionary priority calculation unit 116). With this processing, in the information processing system, it is possible to provide a dictionary data priority when the dictionary user 502 selects dictionary data. That is, it is possible to assist the dictionary user 502 such that they can easily select suitable dictionary data.

In the following description, image capturing information obtained by the camera 100 is referred to as dictionary user image capturing information, and image capturing information already managed by the server 110 is referred to as managed image capturing information. The processing for deciding a dictionary data priority is realized by a computer program stored in the recording unit 406 being loaded into the memory 402 and the CPU 401 reading and executing the computer program in the memory 402. Further, before the start of this processing, the camera 100 used by the dictionary user 502 obtains current image capturing information (dictionary user image capturing information). For example, by obtaining image capturing information related to a location and time at which to use dictionary data, it is possible to provide appropriate dictionary data that accords with the image capturing location and the image capturing time. However, dictionary user image capturing information is not limited to information at the time of image capturing being automatically obtained, and the dictionary user may designate image capturing information. For example, configuration may be taken such that, in a case where dictionary data is to be set in advance before the image capturing date, for example, a dictionary user can designate arbitrary image capturing information.

In step S1101, the CPU 401 of the server 110 obtains dictionary user image capturing information from the camera 100. In step S1102, the CPU 401 obtains an image capturing information group (i.e., managed image capturing information) managed by the image capturing information management unit 115 of the memory 402. At this time, the CPU 401 excludes, from the image capturing information group to be obtained, managed image capturing information of a dictionary data ID for which an average value of the managed image capturing information deviates from the dictionary user image capturing information by what has been predetermined or more. By excluding deviating information, it is possible to reduce a processing amount of the server 110 and reduce processing time. Further, the CPU 401 excludes, from the image capturing information group to be obtained, managed image capturing information of a dictionary data ID for which a variance value associated with the dictionary data ID is outside a predetermined range. By limiting a variance value of managed image capturing information to a designated range, it is possible to switch between a general-purpose dictionary that can be used broadly and a particular dictionary that can be used in a targeted manner.

In step S1103, the CPU 401 calculates a similarity between the dictionary user image capturing information and each piece of managed image capturing information obtained in step S1102. A method of calculating a similarity will be described later with reference to FIG. 12.

In step S1104, the CPU 401 determines whether there is one or more dictionary data ID for which the similarity calculated in step S1103 is greater than or equal to what is predetermined. The CPU 401, if it is determined that there is no dictionary data ID for which the similarity is greater than or equal to what is predetermined, advances the processing to step S1105 since difficult to assign a priority to a dictionary data ID and, otherwise, advances the processing to step S1106. In step S1105, the CPU 401 relaxes a similarity calculation parameter used in step S1103 and returns to step S1103. As described above, by relaxing the similarity calculation parameter, it is possible to increase the similarities calculated in step S1103. Details will be described later with reference to FIG. 12.

In step S1106, the CPU 401 decides a priority of a dictionary data ID based on the calculated similarity. For example, the CPU 401 gives a high priority to a dictionary data ID for which the similarity is high and gives a low priority to a dictionary data ID for which the similarity is low. In addition, a configuration may be taken such that the CPU 401 assumes that a priority cannot be determined for a dictionary data ID for which the similarity is lower than what is predetermined and does not present it to the dictionary user. By thus not presenting dictionary data for which determination cannot be made to the dictionary user, the user can select necessary dictionary data from more carefully selected dictionary data.

As described above, the CPU 401 can select dictionary data for which an image capturing information distribution obtained for respective dictionary data satisfies a predetermined condition (e.g., average value of managed image capturing information does not deviate from new image capturing information by what is predetermined or more) with respect to the user image capturing information (new image capturing information). Further, the CPU 401 can select one or more pieces of dictionary data according to a level of an image capturing information similarity obtained based on image capturing information of each piece of dictionary data and the user image capturing information (new image capturing information).

In step S1107, the CPU 401 transmits the priority of each dictionary data ID decided in step S1106 to the camera 100. The CPU 401 can transmit thumbnail images associated with dictionary data IDs to the camera 100 together with the dictionary data IDs. The CPU 401 then terminates the processing. When the priority of each dictionary data ID is transmitted to the camera 100 according to the processing of step S1107, the camera 100 can reflect the priority of each dictionary data ID in the dictionary selection screen (corresponds to the dictionary priority obtaining unit 104 and the dictionary selection screen 105). In addition, the camera 100 can reflect thumbnail images corresponding to the dictionary data IDs in the dictionary selection screen. Accordingly, the user can select appropriate dictionary data from dictionary data displayed according to the priority. The dictionary selection screen for selecting dictionary data will be described later with reference to FIG. 13.

Figure 12A:
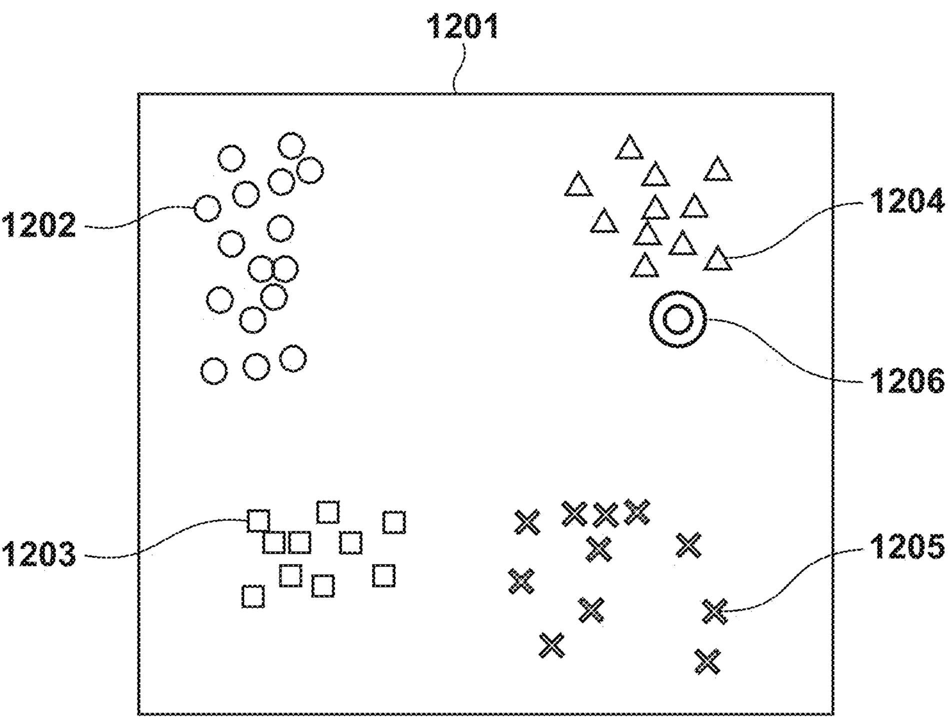
FIGS. 12A and 12B are diagrams for explaining an image capturing information similarity according to the embodiment.

The calculation of an image capturing information similarity in step S1103 will be described with reference to FIG. 12. In the example illustrated in FIG. 12, description will be given using as an example a case where image capturing location information is used as image capturing information. FIG. 12A schematically illustrates a relationship between managed image capturing information and user image capturing information. Reference numeral 1201 represents a map. For example, when the information processing system is used in a zoo or the like, reference numeral 1201 is a map of the zoo's interior. Reference numerals 1202, 1203, 1204, and 1205 are managed image capturing information distinguished by dictionary data ID and indicate, on the map 1201, image capturing locations included in managed image capturing information. In FIG. 12A, representation is made with a plotted shape changed for each dictionary data ID. Reference numeral 1206 indicates an image capturing location obtained as the user image capturing information on the map 1201.

Figure 12B:
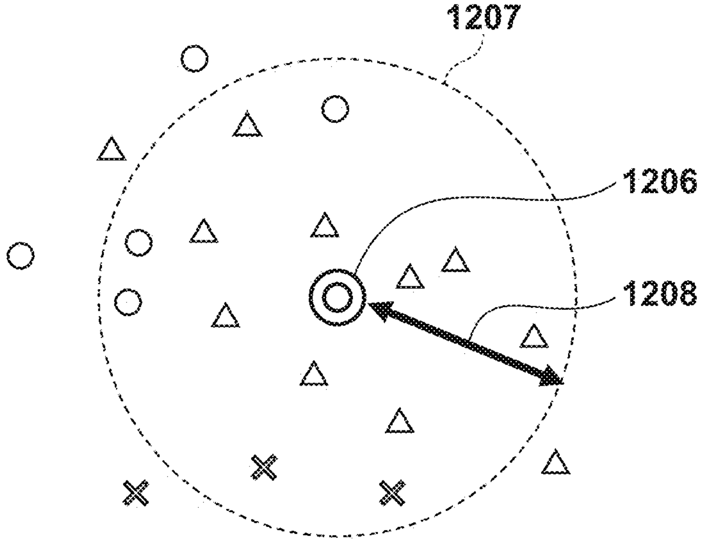

FIG. 12B is a diagram for explaining calculation of an image capturing information similarity. Reference numeral 1207 indicates a concentric circle centered on the image capturing location 1206 in the user image capturing information. When the concentric circle is assumed as a threshold for similarity, a similarity between managed image capturing information and the user image capturing information can be calculated for each dictionary data ID by counting managed image capturing information inside reference numeral 1207 for each dictionary data ID. Further, reference numeral 1208 denotes a distance from the user image capturing information to the threshold 1207, and relaxation of the similarity calculation parameter in step S1106 is realized by increasing the distance 1208. The method of calculating a similarity between managed image capturing information and user image capturing information illustrated in FIG. 12 is one example and may be realized by using another method of classification such as machine learning.

Next, a screen for selecting dictionary data (also referred to as dictionary selection screen; corresponds to the dictionary selection screen 105) in the display unit 216 of the camera 100 will be described with reference to FIG. 13.

Figures 13A, 13B:
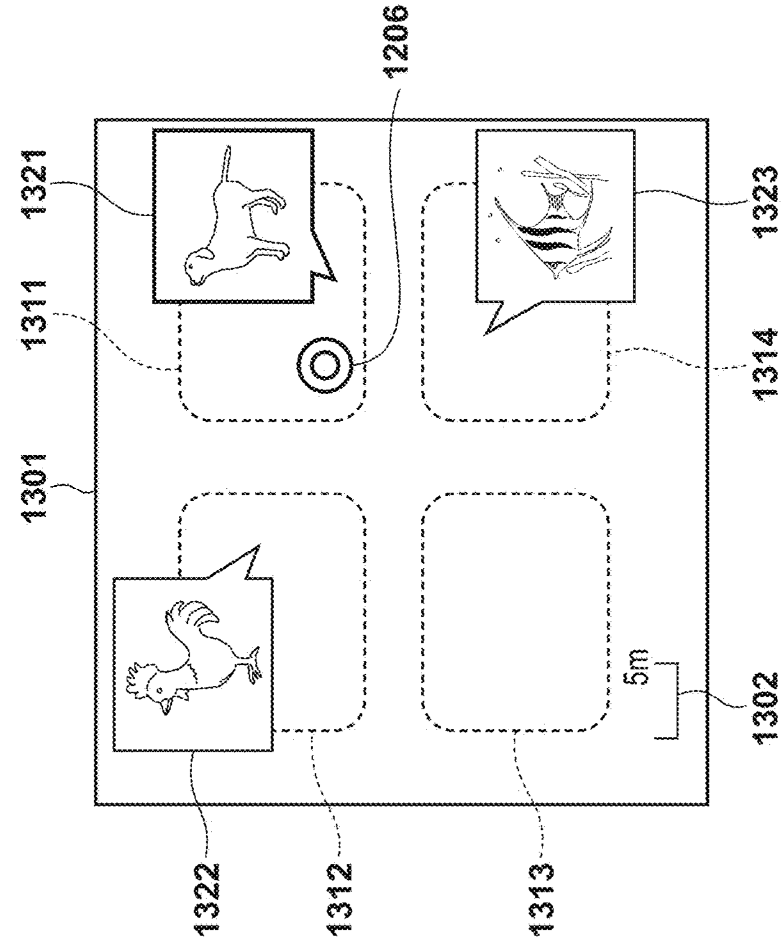
FIGS. 13A and 13B are diagrams illustrating examples of a dictionary selection screen according to the embodiment.

The example illustrated in FIG. 13 also illustrates an example in which a zoo is assumed. FIG. 13A is an example of screen display for when display of a map has been reduced (i.e., wide range display), and FIG. 13B illustrates an example of screen display for when display of the map has been enlarged with respect to a particular area.

Reference numeral 1301 indicates a screen for selecting dictionary data, and the dictionary user can select dictionary data by touching the screen for selecting dictionary data or by operating an operation member. Reference numeral 1302 indicates a scale of the map, and FIG. 13B is displayed in a more enlarged manner than FIG. 13A. An enlargement rate can be changed by a touch operation on the screen for selecting dictionary data or an operation of an operation member.

Reference numerals 1311 to 1314 indicate areas in which animals are present in the zoo. For example, reference numeral 1311 corresponds to an animal petting area, reference numeral 1312 corresponds to a bird area, reference numeral 1313 corresponds to a savannah area, and reference numeral 1314 corresponds to an underwater area. Reference numerals 1321 to 1325 each indicate a thumbnail image managed in association with a respective piece of dictionary data. Tips of popups 1321 to 1325 each indicate an average of image capturing locations in managed image capturing information of a respective dictionary data ID. That is, the CPU 201 displays a thumbnail that is based on an image used for generating dictionary data on the display unit in association with one location (e.g., average value of image capturing locations) on the map. By doing so, the dictionary user can intuitively ascertain contents of dictionary data. In this case, the server 110 can provide the camera 100 with a dictionary data priority, a thumbnail of each piece of dictionary data, and one location (e.g., average value of each piece of dictionary data illustrated in FIG. 10). In the examples of FIGS. 13A and 13B, reference numeral 1321 indicates dictionary data of dog 1, reference numeral 1322 indicates dictionary data of bird, reference numeral 1323 indicates dictionary data of fish, reference numeral 1324 indicates dictionary data of dog 2, and reference numeral 1325 indicates dictionary data of dog 3. The examples of FIGS. 13A and 13B correspond to cases where the number of pieces of dictionary data to be displayed is three and it has been assumed that determination cannot be made for dictionary data for which the priority is fourth or less in the above step S1108. The number of pieces of dictionary data to be displayed may be fixed in advance in the server 110 or may be allowed to be arbitrarily set by the dictionary user via the camera 100.

In the example of FIG. 13A, since the dictionary user is currently located at reference numeral 1206, it is determined that dictionary data corresponding to reference numeral 1321 is dictionary data having the highest priority according to a distance from the image capturing location (i.e., image capturing information) of the dictionary user. Therefore, the CPU 201 of the camera 100 displays the thumbnail 1321 in an emphasized manner. That is, the CPU 201 can display a (e.g., one) thumbnail to be displayed, in an emphasized manner, based on an image capturing information similarity obtained based on image capturing information of each piece of dictionary data and user image capturing information (new image capturing information). In this example, only the thumbnail with the highest priority is displayed in an emphasized manner, but another emphasized display method such as changing color or density in a stepwise manner may be used. In addition, dictionary data of animals in the savannah area 1313 is not displayed on the screen because the priority is fourth or less.

FIG. 13B illustrates a screen for when a part of the animal petting area 1311 has been enlarged. A configuration may be taken such that as the camera 100 enlarges the scale of display, the CPU 401 decreases a threshold for a variance value of image capturing information in similarity calculation in step S1103. That is, as the scale at which the map is displayed decreases, the camera 100 displays dictionary data for which a variance calculated for a respective piece of dictionary data is smaller. In this case, it is possible to display dictionary data with respect to image capturing locations that are more detailed than those of FIG. 13A. As in reference numerals 1321, 1324, and 1325, since characteristics of subjects vary depending on the image capturing location even though they are all dogs, it is possible to select dictionary data more suitable for the conditions of the dictionary user.

(Processing in which Dictionary Data is Used)

Figure 14:
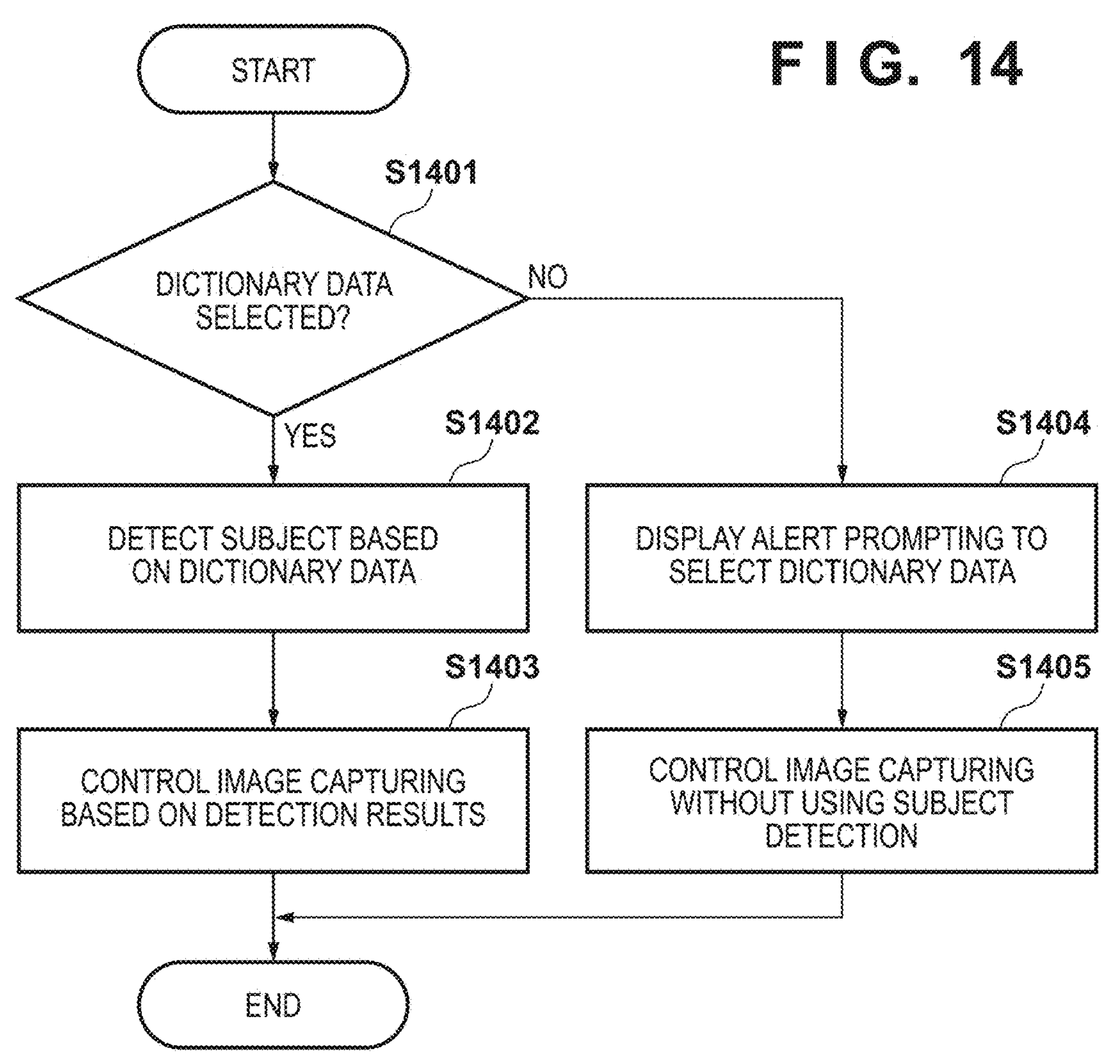
FIG. 14 is a flowchart for explaining a series of operations of processing in which dictionary data is used according to the embodiment.

Next, processing in which dictionary data is used in the camera 100 will be described with reference to FIG. 14. This processing corresponds to the subject detection unit 106. This processing is realized by a computer program stored in the non-volatile memory 203 being loaded into the memory 202 and the CPU 201 reading and executing the computer program in the memory 202 while the camera 100 is powered on.

In step S1401, the CPU 201 determines whether dictionary data is selected by the dictionary user. The CPU 201, if dictionary data is selected, advances the processing to step S1402 and, otherwise, advances the processing to step S1404.

In step S1402, in response to an instruction from the CPU 201, the neural network processing unit 205 detects a subject included in a newly captured image using the selected dictionary data. In step S1403, the CPU 201 performs image capturing control (e.g., auto focus, exposure control, etc.) based on information of the subject detected in step S1402.

In step S1404, the CPU 201 displays an alert on the display unit 216 prompting the user to select dictionary data. Then, in step S1405, the CPU 201 performs image capturing control without using subject detection and then ends the processing.

The above embodiment is not limited to the case where the dictionary user always selects dictionary data, and the dictionary data may be automatically set. For example, the CPU 201 may automatically use dictionary data with the highest priority for a fixed period. Alternatively, the CPU 201 may use a plurality of pieces of high priority dictionary data and use the plurality of pieces of high priority dictionary data at high frequency.

Further, in the above example, description has been given using as an example a case where an image capturing location is used as image capturing information, but managed image capturing information may be classified using other image capturing information (image capturing date, image capturing time, and weather). In this case, a single type of image capturing information (e.g., image capturing date) may be used, or a plurality of types of image capturing information (e.g., image capturing time and image capturing location) may be combined and used by setting respective weights.

As described above, in the above embodiment, dictionary data is generated by obtaining an image to be used for training and image capturing information and training a machine learning model using the obtained image. Further, for each piece of generated dictionary data, image capturing information of an image used for generating (i.e., for training) the dictionary data is associated with the dictionary data. Then, when new image capturing information for selecting dictionary data is obtained, one or more pieces of dictionary data are selected from the plurality of pieces of dictionary data based on the new image capturing information and image capturing information of each piece of dictionary data (e.g., according to an image capturing information similarity). By doing so, it is possible to easily select desired dictionary data from existing dictionary data.

Second Embodiment

An information processing system according to a second embodiment will be described below. In the second embodiment, a dictionary selection screen on which the dictionary user selects dictionary data is different from that of the first embodiment, but other configurations, that is, the system configuration, the configuration of the camera 100 and the server 110 are similar to those of the first embodiment. Therefore, in the present embodiment, differences will be mainly described, and configurations similar to those of the first embodiment will be assigned the same reference numerals and redundant description will be omitted.

Figure 15:
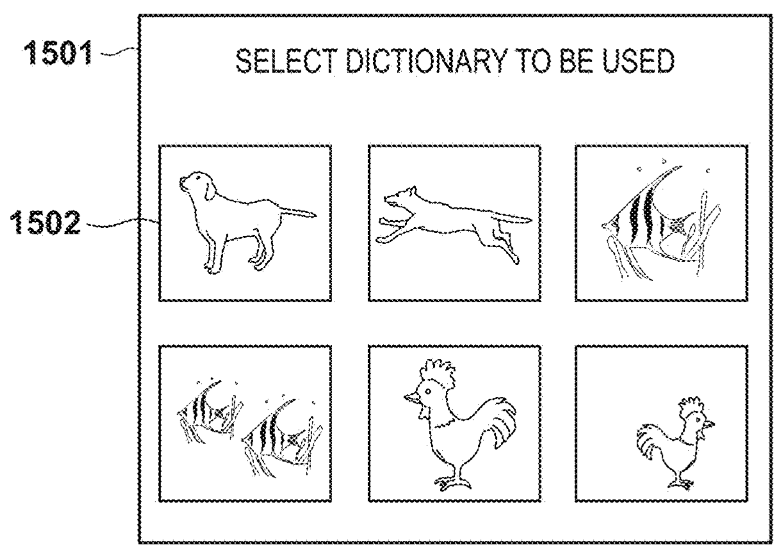
FIG. 15 is a diagrams illustrating examples of a dictionary selection screen according to another embodiment.

An example of the dictionary selection screen according to the second embodiment will be described with reference to FIG. 15. Reference numeral 1501 indicates a dictionary selection screen to be displayed on the display unit 216 by the camera 100. The camera 100 displays a list of dictionary data information transmitted from the server 110 as thumbnail images on the dictionary selection screen 1501. Reference numeral 1502 denotes a thumbnail image of dictionary data. The thumbnail image is a thumbnail image managed by the server 110 in association with dictionary data in the dictionary data management unit and is an image transmitted by the server 110 together with a dictionary data ID to the camera 100 (e.g., in step S1107). The dictionary user can select desired dictionary data using the touch panel of the display unit 216 and an operation member of the operation unit 204.

The camera 100 rearranges pieces of dictionary data according to a dictionary data priority transmitted from the server 110 and displays thumbnail images that correspond to the pieces of dictionary data. That is, the camera 100 can display, based on an image capturing information priority obtained based on image capturing information of each piece of dictionary data and user image capturing information (new image capturing information), thumbnails of pieces of dictionary data in a descending order of that priority. By display being performed in this way, the dictionary user can select a dictionary according to the priority.

Description has been given using as an example a case where in order to display the dictionary selection screen of the present embodiment, the camera 100 rearranges pieces of dictionary data and displays corresponding thumbnail images. However, a configuration may be taken such that the server 110 generates a list of dictionary data IDs arranged in order according to the dictionary data priority and transmit the list and thumbnail images corresponding to the respective dictionary data IDs in the list to the camera 100. By doing so, the camera 100 can display the dictionary selection screen without rearranging the pieces of dictionary data (with a smaller processing amount).

As described above, in the present embodiment, thumbnail images corresponding to pieces of dictionary data are displayed on the dictionary selection screen, and the pieces of dictionary data to be displayed are arranged in order according to a dictionary data priority. By doing so, the dictionary user can easily select desired dictionary data from existing dictionary data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-145571, filed Sep. 7, 2023 which is hereby incorporated by reference herein in its entirety.

What is claimed is:

1. An information processing apparatus comprising:

one or more processors; and a non-transitory memory storing instructions that, when executed by the one or more processors, cause the one or more processors to:

obtain one or more images to be used for training and one or more pieces of image capturing information, each piece of image capturing information being information related to capturing a respective one of the one or more images;

generate a piece of dictionary data, which is information identifying an operation of a trained machine learning model, by training a machine learning model using the obtained one or more images;

manage, for each generated piece of dictionary data, pieces of image capturing information of images used for training a machine learning model pertaining to that piece of dictionary data in association with that piece of dictionary data; and select, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

2. The information processing apparatus according to claim 1, wherein the instructions further cause the one or more processors to select the one or more pieces of dictionary data for which an image capturing information distribution obtained for a respective piece of dictionary data satisfies a predetermined condition with respect to the new image capturing information.

3. The information processing apparatus according to claim 2, wherein the instructions further cause the one or more processors to select the one or more pieces of dictionary data according to an image capturing information similarity obtained based on pieces of image capturing information of a respective piece of dictionary data and the new image capturing information.

4. The information processing apparatus according to claim 1, wherein the instructions further cause the one or more processors to decide a dictionary data priority based on pieces of image capturing information of a respective piece of dictionary data and the new image capturing information and selects the one or more pieces of dictionary data according to the decided priority.

5. The information processing apparatus according to claim 1, wherein each piece of image capturing information includes at least information related to a location at a time of capturing the respective image, information related to the time of capturing the respective image, and information related to a situation at the time of capturing the respective image.

6. The information processing apparatus according to claim 1, wherein the instructions cause the one or more processors to obtain the one or more pieces of image capturing information from a file that is a same as a file that includes a respective one of the one or more images corresponding to the obtained one or more pieces of image capturing information.

7. The information processing apparatus according to claim 1, wherein the information processing apparatus is an image capturing apparatus, and further comprises a display, wherein the instructions further cause the one or more processors to control the display to display, on the display, for each piece of dictionary data, a thumbnail that is based on at least one of images used for training a machine learning model pertaining to that piece of dictionary data.

8. The information processing apparatus according to claim 7, wherein the instructions further cause the one or more processors to control the display to display, in an emphasized manner, a thumbnail based on an image capturing information similarity obtained based on pieces of image capturing information of a respective piece of dictionary data and the new image capturing information.

9. The information processing apparatus according to claim 7, wherein the instructions further cause the one or more processors to control the display to display, based on an image capturing information priority obtained based on pieces of image capturing information of respective pieces of dictionary data and the new image capturing information, thumbnails of pieces of dictionary data in a descending order of the image capturing information priority.

10. The information processing apparatus according to claim 1, wherein each piece of image capturing information includes information related to a location at a time of capturing the respective image, and the information processing apparatus further comprises a communication interface, wherein the instructions further cause the one or more processors to:

identify, for each piece of dictionary data, one location that corresponds to a distribution of locations included in the pieces of image capturing information of respective pieces of dictionary data; and control the communication interface to provide one or more pieces of dictionary data to an image capturing apparatus, and to provide, to the image capturing apparatus, a thumbnail that is based on at least one of images used for training a machine learning model pertaining to a respective piece of dictionary data and the one location on a map so as to cause the image capturing apparatus to display the thumbnail of the respective piece of dictionary data and the one location in association with each other.

11. The information processing apparatus according to claim 1, wherein the information processing apparatus is an image capturing apparatus, and each piece of image capturing information includes information related to a location at a time of capturing the respective image, and the information processing apparatus further comprises a display, wherein the instructions further cause the one or more processors to:

identify, for each piece of dictionary data, one location that corresponds to a distribution of locations included in the pieces of image capturing information for respective pieces of dictionary data; and control the display to display, on the display a thumbnail that is based on at least one of images used for training a machine learning model pertaining to a respective piece of dictionary data and the one location on a map in association with each other.

12. The information processing apparatus according to claim 11, wherein the instructions further cause the one or more processors to;

calculate, for each piece of dictionary data, a variance of locations included in the pieces of image capturing information for the piece of dictionary data; and control the display to display, on the map, the thumbnail in association with the one location, wherein the map is displayed at a scale, and the one or more processors cause the display to preferentially display, as the scale at which the map is displayed becomes smaller, thumbnails corresponding to pieces of dictionary data having lower variance.

13. The information processing apparatus according to claim 1, wherein the instructions further cause the one or more processors to detect a subject included in a newly captured image, using one of the one or more pieces of dictionary data selected based on the new image capturing information and the pieces of image capturing information of a respective piece of dictionary data.

14. A method of controlling an information processing apparatus, the method comprising:

obtaining one or more images to be used for training and one or more pieces of image capturing information, each piece of image capturing information being information related to capturing a respective one of the one or more images;

generating a piece of dictionary data, which is information identifying an operation of a trained machine learning model, by training a machine learning model using the obtained one or more images;

managing, for each generated piece of dictionary data, pieces of image capturing information of images used for training a machine learning model pertaining to that piece of dictionary data in association with that piece of dictionary data; and selecting, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

15. A non-transitory computer-readable storage medium storing instructions for executing a method of controlling an information processing apparatus, the method comprising:

obtaining one or more images to be used for training and one or more pieces of image capturing information, each piece of image capturing information being information related to capturing a respective one of the one or more images;

generating a piece of dictionary data, which is information identifying an operation of a trained machine learning model, by training a machine learning model using the obtained one or more images;

managing, for each generated piece of dictionary data, pieces of image capturing information of images used for training a machine learning model pertaining to that piece of dictionary data in association with that piece of dictionary data; and selecting, in a case where new image capturing information for selecting a piece of dictionary data has been obtained, one or more pieces of dictionary data from a plurality of pieces of dictionary data based on the new image capturing information and pieces of image capturing information of a respective piece of dictionary data.

* * * * *